(12) United States Patent
Terada

(10) Patent No.: US 7,889,268 B2
(45) Date of Patent: Feb. 15, 2011

(54) DIGITAL CAMERA

(75) Inventor: Hiroshi Terada, Mitaka (JP)

(73) Assignee: Olympus Imaging Corp., Tokyo (JP)

( * ) Notice: Subject to any disclaimer, the term of this patent is extended or adjusted under 35 U.S.C. 154(b) by 908 days.

(21) Appl. No.: 11/821,047

(22) Filed: Jun. 19, 2007

(65) Prior Publication Data

US 2008/0030594 A1    Feb. 7, 2008

(30) Foreign Application Priority Data

Aug. 3, 2006    (JP) .............................. 2006-212334

(51) Int. Cl.
*H04N 5/225*    (2006.01)
(52) U.S. Cl. ........................ 348/345; 348/335; 348/360; 348/220.1
(58) Field of Classification Search ................. 348/335, 348/360, 362, 363, 364, 345, 220.1
See application file for complete search history.

(56) References Cited

U.S. PATENT DOCUMENTS

| 4,553,170 | A | 11/1985 | Aoki et al. |
| 7,006,140 | B2 | 2/2006 | Shono |
| 7,365,788 | B2 * | 4/2008 | Ito .............................. 348/335 |
| 7,408,586 | B2 * | 8/2008 | Ueda et al. .................. 348/372 |
| 2004/0155976 | A1 | 8/2004 | Suda |

FOREIGN PATENT DOCUMENTS

| JP | 59-201029 | 11/1984 |
| JP | 2006-301149 | 11/2006 |

* cited by examiner

*Primary Examiner*—Tuan Ho
(74) *Attorney, Agent, or Firm*—Straub & Pokotylo; John C. Pokotylo

(57) ABSTRACT

A digital camera is disclosed, which has a still image shooting mode and a moving image shooting mode, and performs different focusing operations between the still image shooting mode and the moving image shooting mode. According to present invention, the range of focusing tolerance or the driving speed of a focusing optical system can vary between the still image shooting mode and the moving image shooting mode such as to set the range of focusing tolerance wider or the driving speed of the focusing optical system slower in the moving image shooting mode.

13 Claims, 10 Drawing Sheets

DIGITAL CAMERA

CROSS-REFERENCE TO RELATED APPLICATION

This application is based upon and claims the benefit of priority from prior Japanese Patent Application No. 2006-212334, filed on Aug. 3, 2006, the entire contents of which are incorporated herein by reference.

BACKGROUND OF THE INVENTION

1. Field of the Invention

The present invention relates to a digital camera having a moving image shooting function.

2. Description of the Related Art

Many digital cameras can record moving images as well as still images. For example, Japanese Patent Application Laid-Open No. 59-201029 discloses a digital single-lens reflex camera for shooting a moving image in such a manner to retract a quick return mirror (movable mirror) from a shooting optical path and maintain the open state of a focal-plane shutter.

BRIEF SUMMARY OF THE INVENTION

The digital camera of the present invention has a still image shooting mode and a moving image shooting mode, and performs different focusing operations between the still image shooting mode and the moving image shooting mode.

For example, the range of focusing tolerance and the driving speed of a focusing optical system can vary between the still image shooting mode and the moving image shooting mode such as to set the range of focusing tolerance wider or the driving speed of the focusing optical system slower in the moving image shooting mode.

An exemplary structure of the present invention can be expressed as follows. A digital camera having a still image shooting mode and a moving image shooting mode comprises: a mirror member arranged in an optical path of a photographing lens to reflect part of a subject light beam passing through the photographing lens and transmit the remaining part of the subject light beam; an imaging part for receiving the subject light beam transmitted through the mirror member to output a subject image signal; a distance measurement part for receiving the subject light beam reflected by the mirror member to detect a defocus amount of the photographing lens; and a focusing part for performing a focusing operation to drive the focusing optical system in the photographing lens to an in-focus position based on the defocus amount detected by the distance measurement part, wherein in the still image shooting mode, the focusing part performs a first focusing operation prior to still image shooting, and in the moving image shooting mode, the focusing part performs a second focusing operation different in mode from the first focusing operation during moving image recording.

According to the present invention, there can be provided an easy-to-use digital camera capable of acquiring both still and moving images.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

A preferred embodiment of the invention is described below with reference to the accompanying drawings.

A digital camera of the embodiment has a so-called live view display function (also referred to as an electronic finder function). The live view display function is to form a subject image on an image pickup device from a subject light beam through a photographing lens in order to display a moving image for subject image viewing on a display device such as an LCD monitor based on the output of this image pickup device. The digital camera can acquire and record a still image on a recording medium in accordance with a shooting instruction from a camera user. The digital camera can also acquire and record a moving image on the recording medium in accordance with another shooting instruction from the camera user.

Figure 1:
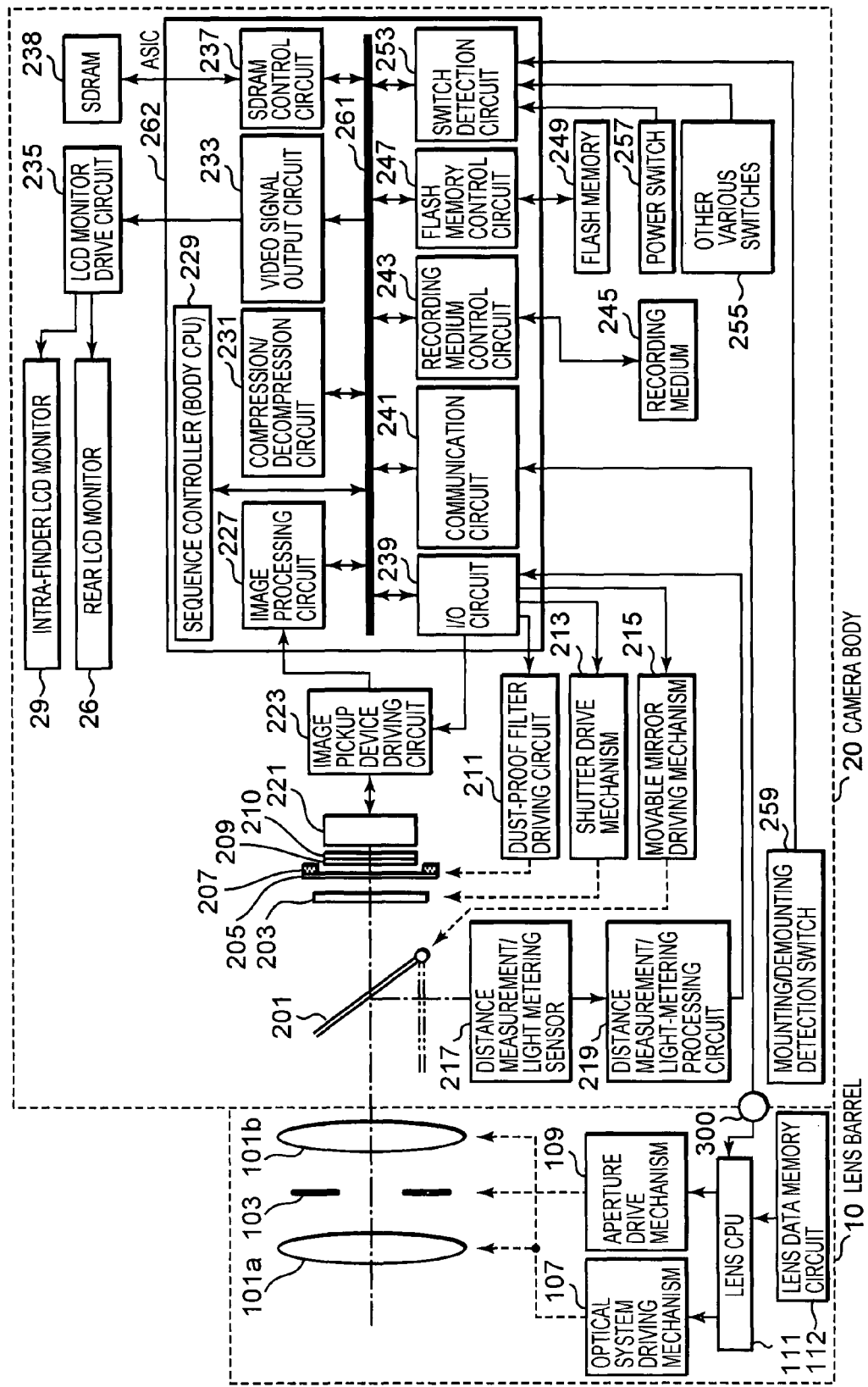
FIG. 1 is a block diagram showing the general structure of an electric system of a digital camera according to a preferred embodiment to which the present invention is applied.

FIG. 1 is a block diagram, mainly of an electric system, of the digital camera according to the embodiment of the present invention. A lens barrel 10 is removably mounted on a mount opening portion (not shown) provided on the front face of a camera body 20. A subject light beam passing through the photographing lens consisting of lenses 101a, 101b, etc. inside the lens barrel 10 is guided into the camera body 20 through the mount opening portion. In the embodiment, the lens barrel 10 and the camera body 20 are constructed separately and electrically connected through a communication contact 300. Further, a mounting/demounting detection switch 259 is provided in the camera body 20 to enable detection of the mounting/demounting state of the lens barrel 10.

Inside the lens barrel 10, the lenses 101a and 101b for focusing and focal length adjustment, and an aperture 103 for adjusting the amount of light passing therethrough are arranged. The lenses 101a and 101b are driven by an optical system driving mechanism 107, and the aperture 103 is driven by an aperture drive mechanism 109. The optical system driving mechanism 107 and the aperture drive mechanism 109 are connected to a lens CPU 111, respectively, and this lens CPU 111 is connected to the camera body 20 through the communication contact 300. The lens CPU 111 controls the components inside the lens barrel 10. In other words, the lens CPU 111 controls the optical system driving mechanism 107 to perform focusing and zoom driving and the aperture drive mechanism 109 to perform aperture control. Note that the focus length adjustment (zooming) is made through a manual operating member (not shown).

Various data are stored in a lens data memory circuit 112, such as various data specific to the lens barrel 10 including, for example, wide-angle side focal length, telephoto side focal length, close side distance, maximum aperture value, minimum aperture value, and information on angle-of-view variations Δkt and Δkw to be described later (see FIG. 7). The lens data memory circuit 112 is connected to the lens CPU 111. The lens CPU 111 transmits the lens data read from the lens data memory circuit 112 to a body CPU 229.

A mirror member 201 formed into a plate-like glass mirror of 0.2 mm thick or less is arranged inside a mirror box of the camera body 20. This mirror member 201 has a property to transmit part of the light beam passing through the lenses 101a, 101b and reflect the remaining part of the light beam. This mirror member 201 is driven by a mirror member driving mechanism 215 to be rotatable about a rotation axis along a direction perpendicular to the paper surface of FIG. 1. When the mirror member 201 is at a position 45 degrees inclined with respect to the optical path of the lenses 101a, 101b (as indicated by a solid line in FIG. 1), part of the subject light beam (e.g., 30 percent thereof) is reflected and guided to a distance measurement/light metering sensor 217 provided at the bottom of the camera body 20. The remaining part of the subject light beam (e.g., 70 percent thereof) is transmitted through the mirror member 201 and guided toward a CCD 221.

On the other hand, when the mirror member 201 is at a retracted position substantially parallel to the optical path of the lenses 101a, 101b and hence not to block the subject light beam (as indicated by a chain double-dashed line in FIG. 1), the entire subject light beam is guided to the CCD 221. The structure of this mirror member 201 will be described later with reference to FIG. 2. In the embodiment, the rotation center of the mirror member 201 is located on the lower side of the mirror box, but the present invention is not limited to this location. The rotation center can be located on the upper side, or it can of course be located on either the right or left side of the mirror box in a direction parallel to the paper surface of FIG. 1. Further, in the embodiment, the rotation center of the mirror member 201 is arranged on the CCD 221 side, but it can be arranged on the side of the mount opening portion. Furthermore, in the embodiment, the reflectance and transmittance are 30 percent and 70 percent, respectively, but these percentages can be changed appropriately. In addition, this mirror member is not necessarily a plate-like glass mirror, and it can be a thin-film mirror (pellicle mirror) arranged inclined at a predetermined angle with respect to the optical path of the photographing lens, or a prism some of whose reflective faces have a light-transmissive property may be arranged in a stationary manner. In other words, any kind of mirror member can be used as long as it is an optical member functioning as a beam splitter for splitting the subject light beam into a light beam in a first direction and a light beam in a second direction.

The distance measurement/light metering sensor 217 is arranged at the bottom of the mirror box in the camera body 20 and at a position to which the light beam reflected by the mirror member 201 is guided. This distance measurement/light metering sensor 217 has a sensor for distance measurement and a light metering sensor. The light metering sensor consists of multi-zone photometric elements for dividing the subject image to measure the brightness of the subject image. The distance measurement sensor is a sensor for distance measurement using a TTL phase-difference method. The output of the distance measurement/light metering sensor 217 is sent to a distance measurement/light metering processing circuit 219. The distance measurement/light metering processing circuit 219 outputs an evaluation metering value based on the output of the light metering sensor, while it measures a defocus amount of the subject image formed through the lenses 101, 101b based on the output of the distance measurement sensor. The distance measurement sensor and the light metering sensor can be constructed either separately or as one unit.

A focal-plane type shutter 203 for exposure time control and blocking light entering the CCD 221 is arranged behind the mirror member 201 on the shooting optical path as the optical axis of the lenses 101a, 101b. The driving of this shutter 203 is controlled by a shutter drive mechanism 213. A dust-proof filter 205 is arranged behind the shutter 203. The dust-proof filter 205 is a filter to prevent dust entering from the mount opening portion of the camera body 20 or generated inside the body from sticking to the CCD 221 or other optical elements, casting the shadows of dust specks on the subject image, and hence making the image unsightly.

A piezoelectric element 207 is fixed around the entire perimeter or in a portion of the perimeter of the dust-proof filter 205. This piezoelectric element 207 is connected to a dust-proof filter driving circuit 211 and driven by this circuit. The piezoelectric element 207 is driven by the dust-proof filter driving circuit 211 to vibrate the dust-proof filter 205 at a predetermined ultrasonic frequency in order to remove dust sticking to the front face of the dust-proof filter 205 using the vibration. Note that the present invention is not limited to the structure using the ultrasonic vibration like in the embodiment as long as it can remove dust sticking to the image pickup device such as the CCD itself or the optical element provided in front of the image pickup device. The ultrasonic vibration mechanism can be replaced by any of various methods as appropriate, such as to blow the dust off through a flow of air using an air pump or the like, or to remove dust by collecting it with electrostatic action.

An infrared cut-off filter 209 is arranged behind the dust-proof filter 205 to cut infrared light components from the subject light beam, and an optical low-pass filter 210 for removing high frequency components from the subject light beam is arranged behind the infrared cut-off filter 209. Then, the CCD 221 as the image pickup device is arranged behind the optical low-pass filter 210 to photoelectrically convert the subject image formed through the lenses 101a, 101b into an electric signal. These dust-proof filter 205, infrared cut-off filter 209, optical low-pass filter 210, and CCD 221 are integrally housed in a hermetically-sealed package (not shown) to prevent dust from entering the package. In the embodiment, the CCD is used as the image pickup device, but the present invention is not limited to the CCD, and any other two-dimensional image pickup device such as a CMOS (Complementary Metal Oxide Semiconductor) can be used.

The CCD 221 is connected to an image pickup device driving circuit 223, and the driving thereof is controlled by a control signal from an I/O circuit 239. The photoelectrically converted analog signal output from the CCD 221 through the image pickup device driving circuit 223 is amplified and subjected to analog-digital conversion (AD conversion). The image pickup device driving circuit 223 is connected to an image processing circuit 227 inside an ASIC (Application Specific Integrated Circuit) 262. This image processing circuit 227 performs various image processing such as digital amplification of digital image data (digital gain adjustment), color correction, gamma (γ) correction, contrast correction, black-and-white/color mode processing, live view display processing, moving image processing for recording on a recording medium, and cropping. The image processing circuit 227 is connected to a data bus 261. Connected to this data bus 261 other than the image processing circuit 227 are, as will be described in detail later, a sequence controller (hereinafter referred to as "body CPU") 229, a compression/decompression circuit 231, a video signal output circuit 233, an SDRAM control circuit 237, an I/O circuit 239, a communication circuit 241, a recording medium control circuit 243, a flash memory control circuit 247, and a switch detection circuit 253.

The body CPU 229 connected to the data bus 261 controls the operation of this digital camera. The compression/decompression circuit 231 connected to the data bus 261 is a circuit for compressing image data stored in an SDRAM 238 using a compression format such as JPEG format for still images or MJPEG format for moving images. Note that the image compression format is not limited to JPEG or MJPEG, and any other compression method can be employed. The video signal output circuit 233 connected to the data bus 261 is connected to a rear LCD monitor 26 and an intra-finder LCD monitor 29 through an LCD monitor drive circuit 235. The video signal output circuit 233 is a circuit for converting image data, stored in the SDRAM 238 or on a recording medium 245, into a video signal for display on the rear LCD monitor 26 and/or the intra-finder LCD monitor 29.

The rear LCD monitor 26 is arranged on the backside of the camera body 20, but the location thereof is not limited to the backside. The rear LCD monitor 26 can be arranged in any position as long as the camera user can view it, and be of any type other than the LCD type. The intra-finder LCD monitor 29 is arranged at a position capable of being viewed by the camera user through a finder eyepiece part. Like the rear LCD monitor 26, the intra-finder LCD monitor 29 can also be of any type other than the LCD type. Note that it is possible to provide only the rear LCD monitor 26 for subject image viewing without the finder eyepiece part and the intra-finder LCD monitor 29.

The SDRAM 238 is connected to the data bus 261 through the SDRAM control circuit 237. This SDRAM 238 is a buffer memory for temporary storage of image data processed by the image processing circuit 227 or image data compressed by the compression/decompression circuit 231. The I/O circuit 239 connected with the dust-proof filter driving circuit 211, the shutter drive mechanism 213, the mirror member driving mechanism 215, the distance measurement/light-metering processing circuit 219, and the image pickup device driving circuit 223 mentioned above controls input and output of data to and from each circuit such as the body CPU 229 through the data bus 261. The communication circuit 241 connected to the lens CPU 111 through the communication contact 300 is connected to the data bus 261 to communicate with the body CPU 229 and the like for exchange of data and control instructions with the body CPU 229 and the like.

The recording medium control circuit 243 connected to the data bus 261 is connected to the recording medium 245 to control the recording of image data and the like onto the recording medium 245. The recording medium 245 is a rewritable recording medium such as an xD-Picture Card™, a Compact Flash™, an SD Memory Card™, or a Memory Stick™. The recording medium 245 is removably loaded into the camera body 200. The digital camera can also be configured such that a hard disk unit such as a Microdrive™ or a radio communication unit is connectable.

The flash memory control circuit 247 connected to the data bus 261 is connected to a flash memory 249. This flash memory 249 stores a program for controlling the overall flow of the camera, and the body CPU 229 controls the digital camera according to the program stored in this flash memory 249. The flash memory 249 is an electrically rewritable nonvolatile memory.

A power switch 257 to be turned on or off in conjunction with s power switch lever for controlling power supply to the camera body 20 and the lens barrel 10, and various switches 255 are connected to the data bus 261 through a switch detection circuit 253. The various switches 255 include switches linked with a shutter release button, a switch linked with a playback button to instruct a playback mode, switches linked with an arrow pad to instruct the movement of a cursor on the screen of the rear LCD monitor 26, switches linked with a mode dial to instruct shooting modes, an OK switch linked with an OK button to confirm each selected mode or the like, a mounting/demounting detection switch 259, etc.

The release button has a first release switch to be turned on when the camera user presses the release button halfway and a second release switch to be turned on when the camera user fully presses the release button. When this first release switch (hereinafter abbreviated as "1R") is turned on, the camera performs shooting preparation operations, such as focus detection, focusing of the photographing lens, measuring subject brightness, etc. Then, when the second release switch (hereinafter abbreviated as "2R") is turned on, the camera performs a shooting operation for capturing image data of a subject image based on the output of the CCD 221 as the image pickup device.

Figure 2:
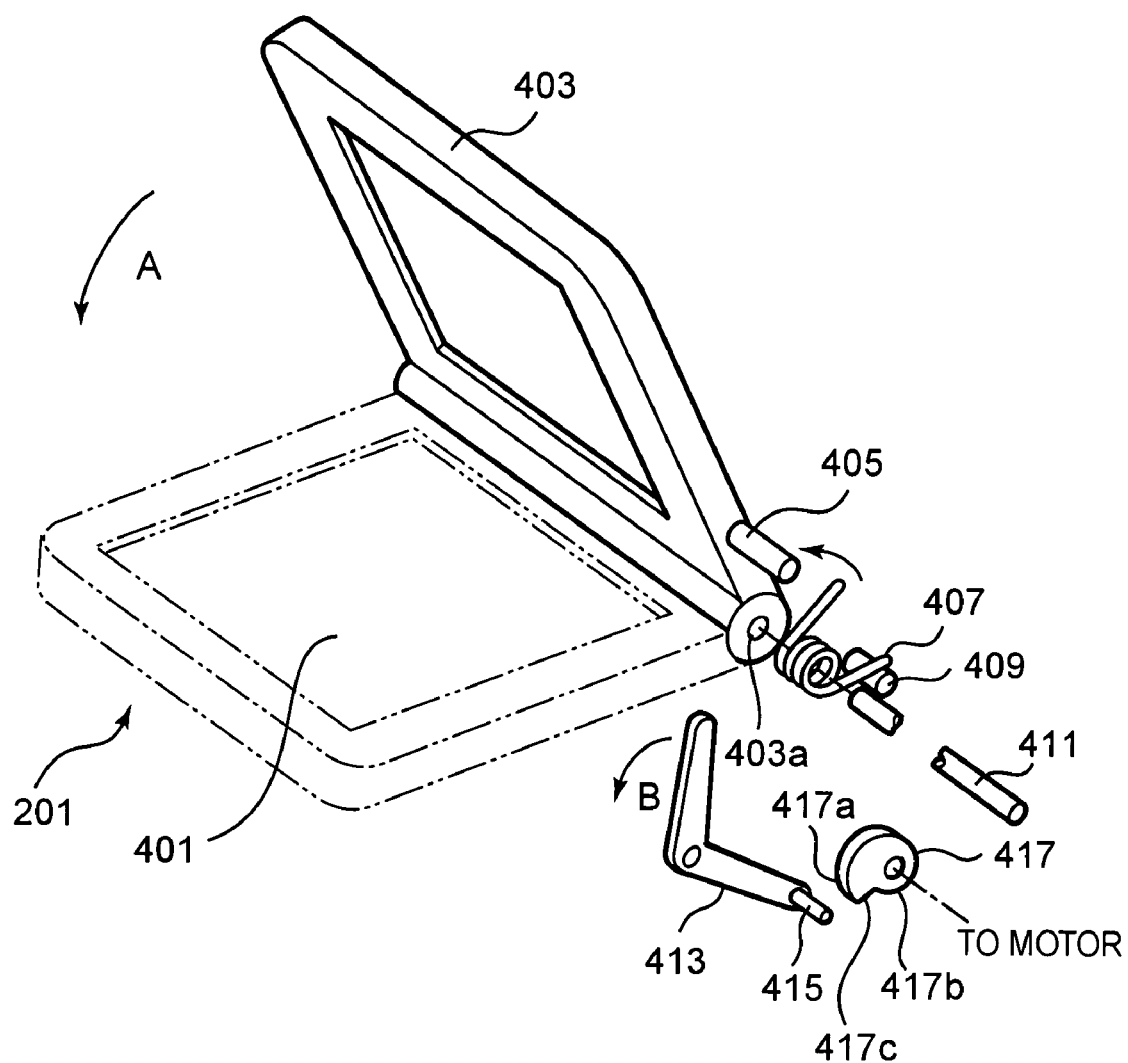
FIG. 2 is an exploded perspective view showing the structure of a movable half mirror according to the preferred embodiment to which the present invention is applied.

Referring next to FIG. 2, a drive mechanism and a retracting mechanism of the mirror member 201 will be described. A half mirror 401, which transmits part of the subject light beam and reflects the remaining part of the subject light beam, is held by a mirror frame 403. This mirror frame 403 is rotatable around a shaft 411 inserted into a through-hole 403a. In this case, the rotation axis 201a in FIG. 1 is the central axis of the shaft 411. Both ends of an open spring 407 are engaged between a pin 409 fixed to the camera body 20 and a drive pin 405 embedded in the mirror frame 403, respectively, and a coil portion of this open spring 407 is wound around the shaft 411. The mirror frame 403 is urged counterclockwise (in arrow A direction) in FIG. 2 by the spring force of this open spring 407. The drive pin 405 is engaged with one end of a locking lever 413, and a cam pin 415 embedded in the other end of this locking lever 413 is in engaging contact with a mirror cam 417. The drive pin 405 is engaged with one end of a locking lever 413, and a cam pin 415 embedded in the other end of this locking lever 413 is in engaging contact with a mirror cam 417.

The rotation center of the locking lever 413 is pivotally supported by a mirror box, not shown, and the locking lever 413 is urged counterclockwise (in arrow B direction) in FIG. 2 by the spring force of the open spring 407 through the drive pin 405, bringing the cam pin 415 of the locking lever 413 into press contact with the cam surface of the mirror cam 417. The cam surface of the mirror cam 417 is so formed that the radial length from the rotation center varies. In other words, it is formed such that the distance from the rotation center will be long at a locked position 417a and shorter at a lock-released position 417b than at the locked position 417a on the cam surface. Then, the cam surface is formed counterclockwise from the locked position 417a to the lock-released position 417b with a step level difference 417c therebetween to shift smoothly from the lock-released position 417b to the locked position 417a.

When the locked position 417a of the mirror cam 417 is in contact with the cam pin 415, since the locking lever 413 is restricted by the mirror cam 417 not to rotate in the arrow B direction, the mirror frame 403 is retained in the reflecting position. Then, when the mirror cam 417 is rotated clockwise in FIG. 2 from this position via the step level difference 417c to a position where the lock-released position 417b comes into contact with the cam pin 415, the locking lever 413 becomes rotatable in the arrow B direction. This causes the mirror frame 403 to move in the arrow A direction by the urging force of the open spring 407 to the retracted position. The mirror cam 417 is driven to rotate by a motor (not shown).

Thus, the drive mechanism for driving the mirror member 201 to the reflecting position (indicated by a solid line in FIG. 2) inside the shooting optical path includes the mirror cam 417, the locking lever 413, etc. On the other hand, the retracting mechanism for driving the mirror member 201 to the retracted position (indicated by a chain double-dashed line in FIG. 2) retracted from the shooting optical path includes the open spring 407. Note that the drive mechanism and the retracting mechanism are not limited to such a structure, and any other structure can be employed as long as these mechanisms can drive the mirror member 201.

Since the mirror member 201 is thus constructed, when the cam pin 415 is driven by the motor (not shown) to the position where it comes into contact with the lock-released position 417b, the mirror frame 403 and the locking lever 413 rotate in the arrow B direction by the urging force of the open spring 407 to move the mirror frame 403 to the retracted position indicated by the chain double-dashed line in FIG. 2. Under this condition, when the mirror cam 417 is rotated by the motor to the locked position 417a where it comes into contact with the cam pin 415, the locking lever 413 is rotated clockwise (in the opposite direction of the arrow B) to rotate the mirror frame 403 clockwise (in the opposite direction of the arrow A) through the drive pin 405 against the urging force of the open spring 407, thereby locating the mirror frame 403 at the reflecting position as indicated by the solid line in FIG. 2.

Figure 3:
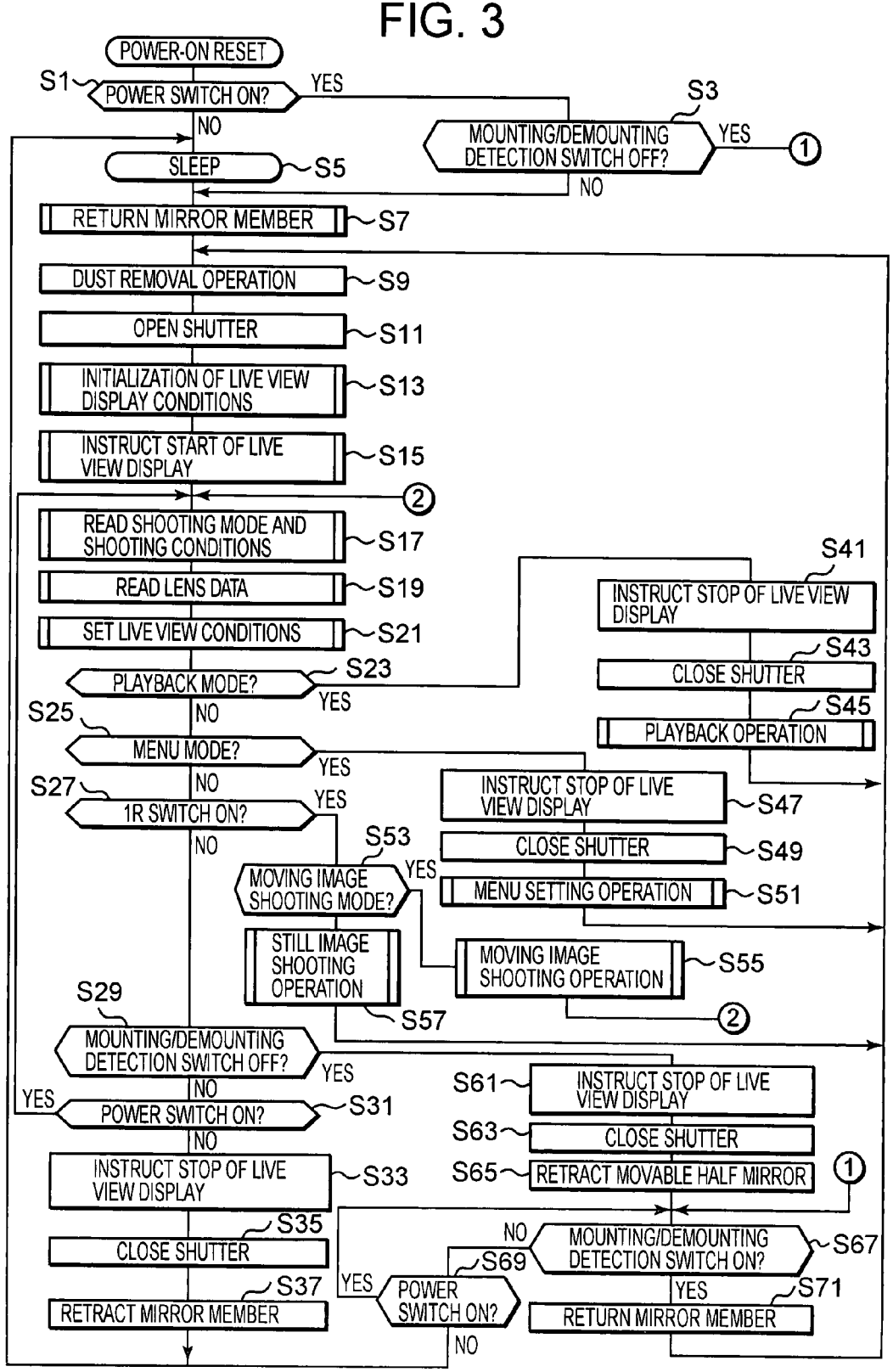
FIG. 3 is a flowchart showing a power-on reset operation according to the preferred embodiment of the present invention.

Referring next to flowcharts of FIGS. 3 to 6, the operation of the digital camera according to the preferred embodiment of the present invention will be described. When the digital camera enters a flow of power-on reset as shown in FIG. 3, it is determined whether the power switch 257 of the camera body 20 is on (S1). As a result of determination, if the power switch 257 is off, the procedure goes to step S5 to bring the digital camera into a sleep state as a power saving state. In this sleep state, interrupt processing is performed only when the power switch 257 is turned on, and processing for turning the power switch on is performed in step S7 and below. All operations but the power-switch interrupt processing are stopped until the power switch is turned on to minimize power source battery drain.

In step S1, if the power switch 257 is on, the procedure goes to step S3 to determine whether mounting/demounting detection switch 259 is off. As mentioned above, the mounting/demounting detection switch 259 is turned off when the camera body 20 is removed from the lens barrel 10. If it is off, i.e., when the lens barrel 10 has been detached, the procedure shifts to step S67 to be described later. This is to perform the same processing as the lens demounted state when the power switch lever of the camera body 20 is operated to power on the digital camera in such a state that the lens barrel 10 has been detached. In step S3, if the mounting/demounting detection switch 259 is on, the procedure goes to step S7 and below to perform processing for turning on the power switch.

In step S7, the mirror member 201 is returned. When the power switch 257 is off-state, since the mirror member 201 is at the position retracted from the shooting optical path (i.e., in a state as indicated by the chain double-dashed line in FIG. 1), the mirror member 201 is returned from this retracted state. This causes the subject light beam from the lens barrel 10 to be guided to the distance measurement/light metering sensor 217, enabling light metering and distance measurement as needed. In step S9, a dust removal operation of the dust-proof filter 205 is performed. This operation is to remove dust and the like sticking to the dust-proof filter 205 using ultrasonic waves as mentioned above by applying a drive voltage to the piezoelectric element 207 fixed to the dust-proof filter 205 from the dust-proof filter driving circuit 211. Then, an opening operation of the shutter 203 is performed through the shutter drive circuit 213 (S11).

Thus, since the subject light beam transmitted through the mirror member 201 is not blocked by the shutter 203, a subject image is formed on the CCD 221. Then, live view conditions are initialized to start a live view for displaying a moving subject image on the rear LCD monitor 26 using image data captured by this CCD 221 (S13). In the initialization of the live view conditions, default values for electronic shutter speed TV of the CCD 221 and ISO sensitivity SV are set. A frame rate for live view display is also set (30 fps in the embodiment). Here, reading from the CCD 221 and processing in the image processing circuit 227, the video signal output circuit 233, the LCD monitor drive circuit 235, and the like are so performed that the moving image will be displayed on the rear LCD monitor 26 at the set frame rate. Now that the live view display is ready, the start of the live view display is instructed (S15). The image processing circuit 227 controls the live view display operation in response to this start instruction.

Next, information on shooting conditions including, if any, a shooting mode such as the still image shooting mode like a program shooting mode set with the mode dial (not shown) or the like or the moving image shooting mode, the ISO sensitivity, and the manually set shutter speed or aperture value is read (S17). The body CPU 229 communicates with the lens CPU 111 to detect not only various lens data stored in the lens data memory circuit 112 such as, for example, wide-angle side focal length, telephoto side focal length, close side distance, maximum aperture value, minimum aperture value, and information on angle-of-view variations Δkt and Δkw (see FIG. 7), but also the status of the optical system driving mechanism 107. Then, the various lens data such as the currently set focal length, the currently set in-focus position, etc. are read (S19).

Then, image data of the moving image is made acquirable at an exposure value EV corresponding to a target optimum amount of exposure, and live view conditions for displaying an image with a proper brightness (color value) on the rear LCD monitor 26 and/or the intra-finder LCD 29 are set (S21). In this step, conditions for electronic shutter speed TV and the sensitivity SV upon driving the CCD 221 are set, and for first time setting, the electronic shutter speed TV and the sensitivity SV are adjusted using the values initialized in step S13 to obtain a target image brightness.

Next, the procedure goes to step S23 to determine whether the mode is a playback mode or not. This playback mode is a mode set by pressing the playback button to read image data recorded on the recording medium 245 and display a corresponding image on the rear LCD monitor 26 and/or the intra-finder LCD 29. As a result of determination, if the playback mode is set, the procedure shifts to step S41 to instruct the image processing circuit 227 to stop the live view display. Then, after the shutter 203 is closed (S43), the image data recorded on the recording medium 245 are read and decompressed by the compression/decompression circuit 231. Then, the corresponding still image or moving image is playback-displayed on the rear LCD monitor 26 and/or the intra-finder LCD 29 through the video signal output circuit 233 and the LCD monitor drive circuit 235 (S45). During playback, if any manual operation is performed such as the half-press of the release button, the playback operation is terminated and the procedure returns to step S9 to repeat the above-mentioned sequence of operations.

In step S23, if the playback mode is not set, the procedure goes to step S25 to determine whether a menu mode is set. This step is to determine whether a menu button is operated to set the menu mode. As a result of determination, if the menu mode is set, an instruction to stop the live view is output (S47) in the same manner when the playback mode is set, and an instruction to close the shutter 203 is output (S49). Then, a menu setting operation is performed (S51). After completion of the menu setting operation, the procedure returns to step S9 to repeat the above-mentioned sequence of operations.

As a result of determination in step S25, if the menu mode is not set, the procedure goes to step S27 to determine whether the release button has been pressed halfway, i.e., whether 1R switch is on. As a result of determination, if 1R is on, the procedure shifts to step S53 to determine whether the shooting mode read in step S17 is a moving image mode. As a result of determination, if it is the moving image mode, the procedure goes to step S55 to execute a subroutine for moving image shooting operation. On the other hand, if it is not the moving image mode, i.e., if it is the still image mode, the procedure goes to step S57 to execute a subroutine for still image shooting operation. The subroutine for moving image shooting operation will be described later with reference to FIG. 6, and the subroutine for still image shooting operation will be described later with reference to FIG. 5. After completion of the subroutine for moving image shooting operation, the procedure returns to step S17, and after completion of the subroutine for still image shooting operation, the procedure returns to step S9, repeating the above-mentioned steps, respectively.

As a result of determination in step S27, if 1R switch is off, the procedure goes to step S29 to determine whether the mounting/demounting detection switch 259 is off or not like in step S3. When the lens barrel 10 is detached, an instruction to stop the live view display is output (S61) in the same manner as in steps S41 and S43 in the playback mode, and the shutter 203 is closed (S63). After that, the retracting operation of the mirror member 201 is performed (S65). As mentioned above, the retracting operation is performed by driving the motor to rotate the mirror cam 417 in order to rotate the mirror frame 403 by the urging force of the open spring 407 to the position retracted from the shooting optical path (to the position indicated by the chain double-dashed line in FIGS. 1 and 2).

After completion of the retracting operation of the mirror member 201, or if it is determined in step S3 that the mounting/demounting detection switch 259 is off (i.e., when the lens barrel 10 has been detached), the procedure goes to step S67 to determine whether the mounting/demounting detection switch 259 is on or not. This step is to determine whether the lens barrel 10 has been mounted or not again after detection of demounting of the lens barrel 10 in step S29. As a result of determination, if it has been mounted, the procedure goes to step S71 to return the mirror member 201. In this step, as mentioned above, the motor is driven to rotate the mirror cam 417 so that the locking lever 413 is rotated clockwise along the cam surface against the urging force of the open spring 407. As a result, the mirror frame 403 is inserted into the optical path of the lenses 101a, 101b. After completion of the return of the mirror member 201, the procedure returns to step S9 to repeat the above-mentioned steps.

In step S67, if the mounting/demounting detection switch 259 is off, the procedure goes to step S69 to determine whether the power switch 257 is on or not. When the lens barrel 10 has been detached and the power switch 257 is on, even if any of the various operation buttons is operated, the camera operation is disabled to prevent malfunction because the mount opening portion remains open. To this end, the digital camera enters a waiting state in which the mounting state of the lens barrel 10 and the operation state of the power switch lever are repeatedly determined in step S67 and step S69, respectively. In step S67, if it is determined that the power switch 257 is off, the procedure returns to step S5 to bring the digital camera into the sleep state. Note that, if it is detected in step S67 that the lens barrel 10 remains detached, the procedure can omit step S69 and return to step S5 to bring the digital camera into the sleep state. Note further that any modification after returning to step S9 is possible, such as to perform an operation based on actuation of any of the various operation buttons.

As a result of determination in step S29, if the mounting/demounting detection switch 259 is on, i.e., when the lens barrel 10 has been mounted on the camera body, the procedure goes to step 31 to determine whether the power switch 257 is on or not. As a result of determination, if it is on, the procedure returns to step S17 to repeat the above-mentioned steps.

After the live view display is restarted in step S15, the subject light beam transmitted through the mirror member 201 is not blocked by the shutter 203 unless any of the various operation buttons is operated in step S23 and below. Therefore, the subject image is formed on the CCD 221, and the live view display is provided on the rear LCD monitor 26 and/or the intra-finder LCD 29 to display the image data captured by this CCD 221 as a moving image.

In step S31, if it is determined that the power switch 257 is off, the image processing circuit 227 is instructed to stop the live view display (S33) in the same manner as in steps S41 and S43, and the shutter 203 is closed (S35). Then, after the retracting operation of the mirror member 201 is performed (S37) in the same manner as in the above-mentioned step S65, the procedure returns to step S5 to bring the digital camera into the sleep state.

Figure 4:
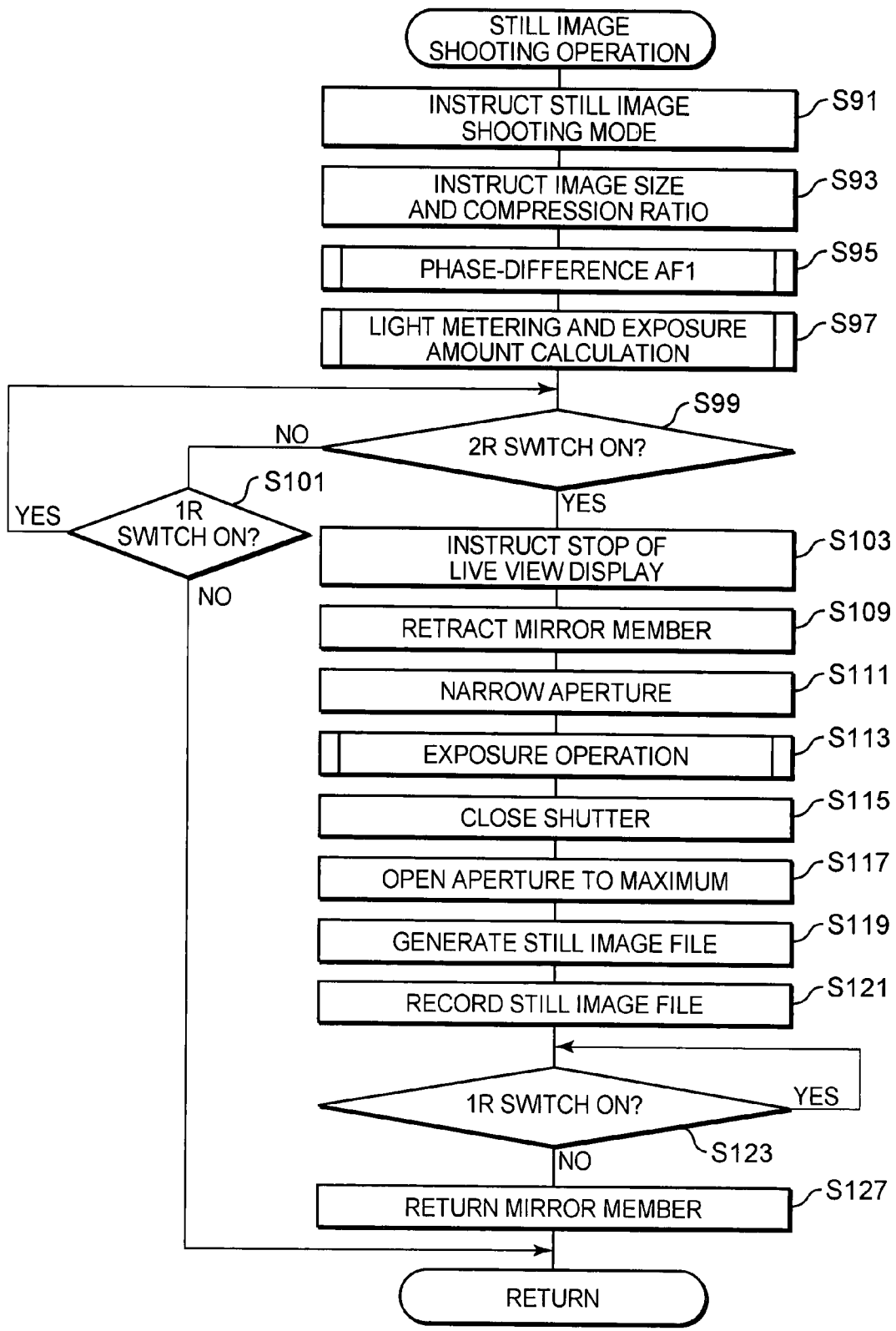
FIG. 4 is a flowchart of a still image shooting operation according to the preferred embodiment of the present invention.

Referring next to FIG. 4, the subroutine for still image shooting operation in step S57 will be described. As mentioned above, this subroutine is executed at the half-press of the release button on condition that the still image shooting mode such as a normal program shooting mode is selected. First, the image processing circuit 227, the compression/decompression circuit 231, and the like are instructed that the current shooting mode is the still image shooting mode (S91) to enable these circuits to perform processing appropriate for still images.

After completion of instruction of the still image mode, the image processing circuit 227 and the compression/decompression circuit 231 are instructed of the image size and compression ratio based on the image size and compression ratio set by the user in the menu mode (S93). Here, the image size can be, for example, 3200×2400, 1600×1200, 640×480, etc. The compression ratio is automatically determined according to the image size, but the user can, of course, set any other compression ratio.

Then, a subroutine of phase-difference AF 1 is executed based on the distance measurement operation and the distance measurement results to drive the photographing lens to an in-focus position (S95). Upon distance measurement, the distance measurement sensor in the distance measurement/light metering sensor 217 receives the subject light beam reflected by the mirror member 201 so that the distance measurement/light metering processing circuit 219, the body CPU 229, and the like detect a defocus amount of the lenses 101a, 101b by a TTL phase-difference method using the output of this distance measurement sensor. Then, based on the detected defocus amount, the optical system drive mechanism 107 drives the lenses 101a, 101b to the in-focus position through the lens CPU 111. This phase-difference AF 1 performs AF more accurate than a subroutine of phase-difference AF 2 in step S175 to be described later. The details of the subroutine of this phase-difference AF 1 will be described later with reference to FIG. 6.

Next, light metering/exposure amount calculation is performed (S97). Upon light metering, subject light beam reflected by the mirror member 201 is received by the light metering sensor in the distance measurement/light metering sensor 217 and processed by the distance measurement/light metering processing circuit 219 to detect a subject brightness BV. The body CPU 229 uses this subject brightness BV to determine the exposure value EV and further to determine exposure conditions such as shutter speed or aperture value according to the shooting mode or the like.

After completion of the light metering/exposure amount calculation, it is determined whether the release button has been fully pressed, i.e., whether 2R is on or not (S99). As a result of determination, if it is off, the procedure goes to step S101 to determine whether 1R is on or not, i.e., whether the release button has been pressed halfway or has not been pressed at all. If the release button remains pressed halfway after jumping to the subroutine for still image shooting operation at the half-press of the release button, the digital camera enters a waiting state in which determinations in steps S99 to S101 are repeated. Then, when the camera user removes his or her finger from the release button to turn 1R off, the procedure returns to step S9 in the power-on reset routine.

Returning to step S99, if 2R switch is on as a result of determination, i.e., when the release button is fully pressed, the procedure shifts to an imaging operation for acquiring a still image. First, in step S103, an instruction to stop the live view is output to the image processing circuit 227. This is to prevent disturbance of the subject image beam incident on the CCD 221 due to the movement of the mirror member 201 to the retracted position upon acquiring a still image in order to prevent the live view image from becoming unsightly on the rear LCD monitor 26 and/or the intra-finder LCD 29.

After that, the retracting operation of the mirror member 201 is performed in the same manner as in step S65 (S109). In general, acquiring and recording of high-quality image data is desired upon acquiring and recording of a still image, so that the mirror member 201 is retracted to avoid the degradation of image quality due to the mirror member 201.

After completion of retracting the mirror member 201, the lens CPU 111 is commanded to instruct the aperture drive mechanism 109 to narrow the aperture 103 to the set aperture value or the aperture value calculated in step S97 (S111). After completion of narrowing the aperture, an exposure operation of the CCD 221 is performed to acquire a still image (S113). Upon the start of this exposure operation, since the mirror member 201 is already moved to the retracted position, the entire subject light beam passing through the lenses 101a, 101b is focused to form the subject image on the CCD 221.

Under this condition, the resetting of the electronic shutter of the CCD 221 is canceled to start accumulation of electric charges of photoelectric conversion current representing the subject image. Then, when the exposure time manually preset or set in step S73 has elapsed, the electronic shutter of the CCD 221 stops accumulation of the electric charges of the photoelectric conversion signal. In the exposure operation of step S113, the exposure time is controlled by the electronic shutter of the CCD 221, but the present invention is not limited thereto, and the exposure time can also be controlled by the shutter 203. In this case, front and rear curtains of the shutter 203 needs moving to their initial positions before the start of the exposure operation.

Next, the shutter 203 is closed (S115), and an instruction to open the aperture 103 to the maximum is output to the lens CPU 111 (S117). Further, the image signal acquired by the CCD 221 accumulating, the electric charges is read out, subjected to image processing performed by the image processing circuit 227 and the like according to the image size and compression ratio instructed in step S93, and subjected to processing such as signal compression performed by the compression/decompression circuit 231 to generate a still image file (S119). The generated still image file is recorded on the recording medium 245 (S121). After completion of recording of the image data, it is determined in step S123 whether 1R switch is on, i.e., whether the release button is in the half-pressed state. When 1R switch is turned off, the procedure goes to step S127 to return the mirror member 201 to the shooting optical path in the same manner as in step S7, and returns to the power-on reset routine after completion of the return of the mirror member 201.

In the subroutine for still image shooting operation of the embodiment, the mirror member 201 is retracted from the shooting optical path upon the imaging operation for acquiring a still image. This can prevent image degradation caused when the subject light beam is transmitted through the mirror member 201 due to the effects of the refractive index and thickness of the half mirror. Further, since the amount of subject light is not attenuated by the half mirror, the amount of light upon acquiring the still image can increase, enabling shooting at a fast shutter speed.

Further, in the embodiment, since the mirror member 201 is in the shooting optical path in step S7, automatic focusing by a phase-difference AF method can be performed immediately after the release button is pressed halfway. In other words, distance measurement can be started more quickly than the case where the mirror member 201 is inserted into the shooting optical path after the release button is pressed halfway.

Figure 5:
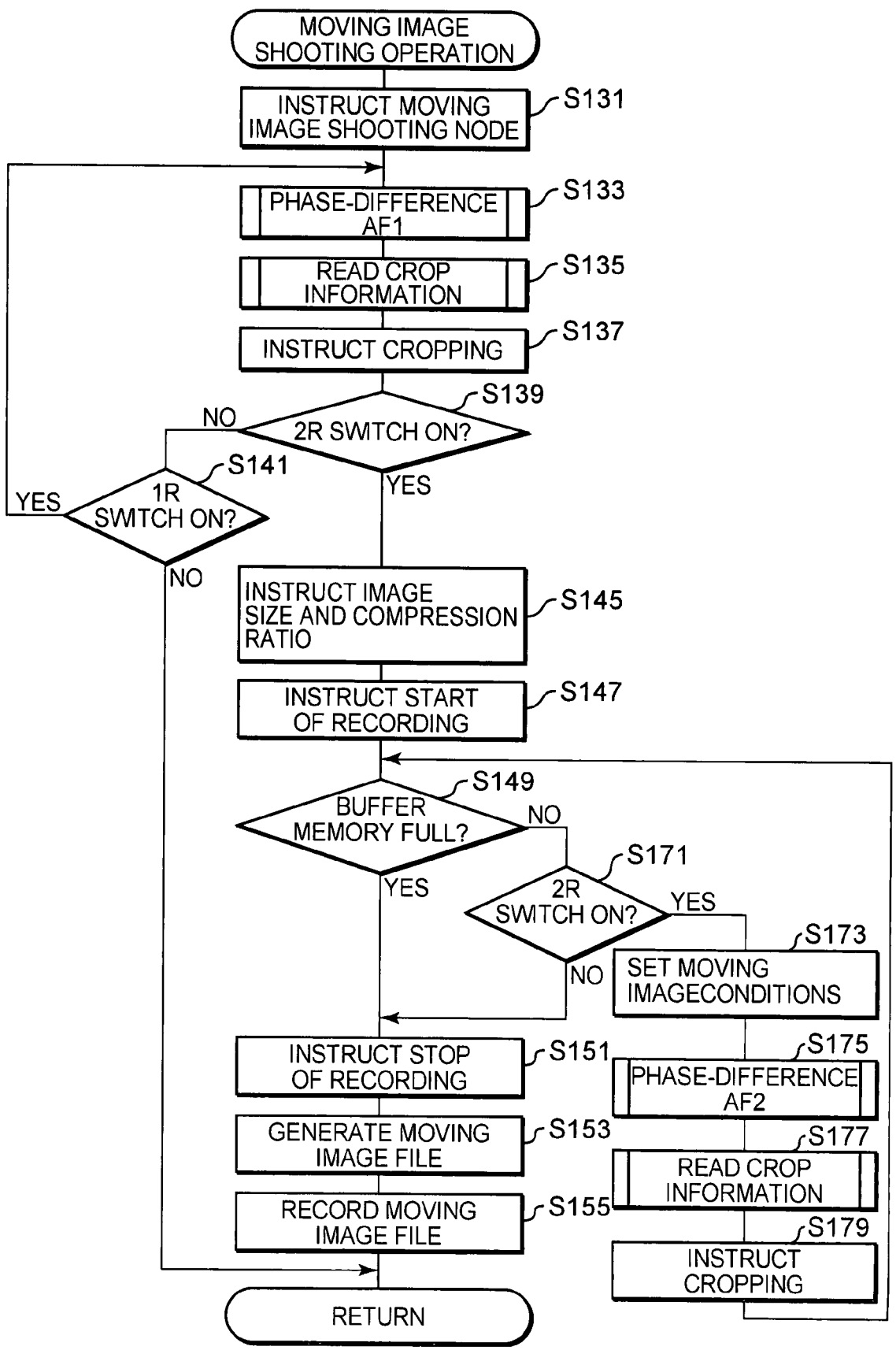
FIG. 5 is a flowchart of a moving image shooting operation according to the preferred embodiment of the present invention.

Referring next to FIG. 5, the subroutine for moving image shooting operation will be described. As mentioned above, this subroutine is executed at the half-press of the release button on condition that the moving image shooting mode is selected. In this subroutine, the angle of view of the display image is controlled upon moving image shooting not to change according to changes in focusing position (in-focus position). Before explaining each step, display with a constant angle of view will be described.

Some types of lenses for single-lens reflex can change the angle of view to achieve downsizing and high performance.

When shooting a moving image using such a type of lens, the recorded moving image has changes in angle of view caused by focusing, causing a sense of discomfort. Therefore, in the embodiment, information on angle-of-view variations Δkt, Δkw (see FIG. 7) and the like is used to change the crop position of image data in order not to cause any change in angle of view due to focusing.

Figure 7:
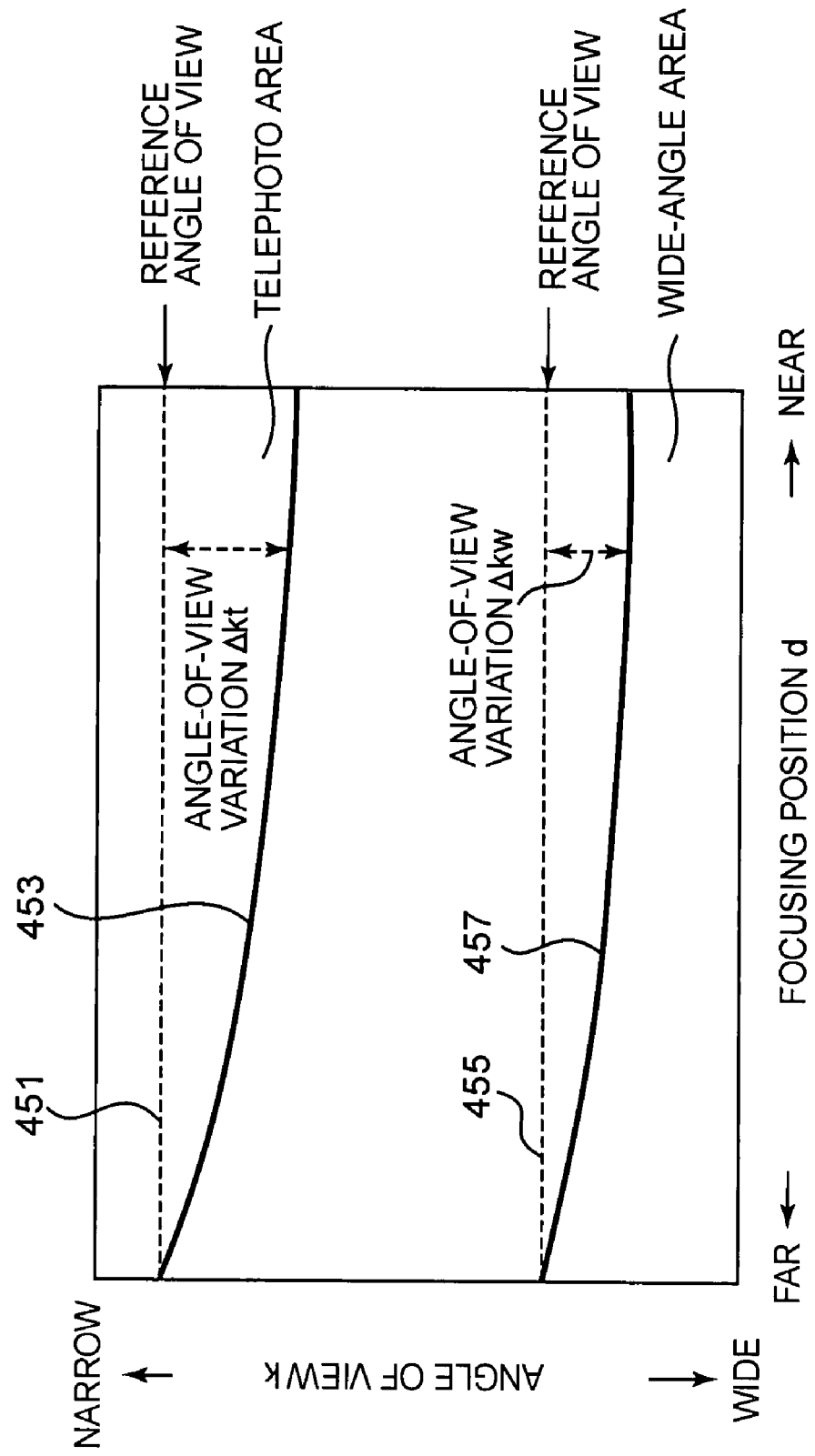
FIG. 7 is a graph showing the relationship between the angle of view (focal length) and the focusing position (in-focus position) according to the preferred embodiment of the present invention.

FIG. 7 is a graph showing the relationship between the angle of view (focal length) and the focusing position (in-focus position). Suppose that the focal length changes toward the telephoto side without any change in angle of view. In this case, even if the focusing position (in-focus position) changes, the angle of view (focal length) is constant as indicated by a reference angle-of-view line 451. Similarly, suppose that the focal length changes toward the wide-angle side without any change in angle of view. In this case, even if the focusing position (in-focus position) changes, the angle of view (focal length) is also constant as indicated by a reference angle-of-view line 455. In practice, however, the angle of view (focal length) changes as the focusing position changes. There is a lens that will change the angle of view by an amount of change Δkt at a telephoto side with respect to the reference angle of view as indicated by an angle-of-view curve 453. Similarly, there is a lens that will change the angle of view by an amount of change Δkw at a wide-angle side with respect to the reference angle of view as indicated by an angle-of-view curve 457. Note that FIG. 7 is a schematic graph and these angle-of-view variations Δkt and Δkw are indicated larger than the actual variations.

Figure 8:
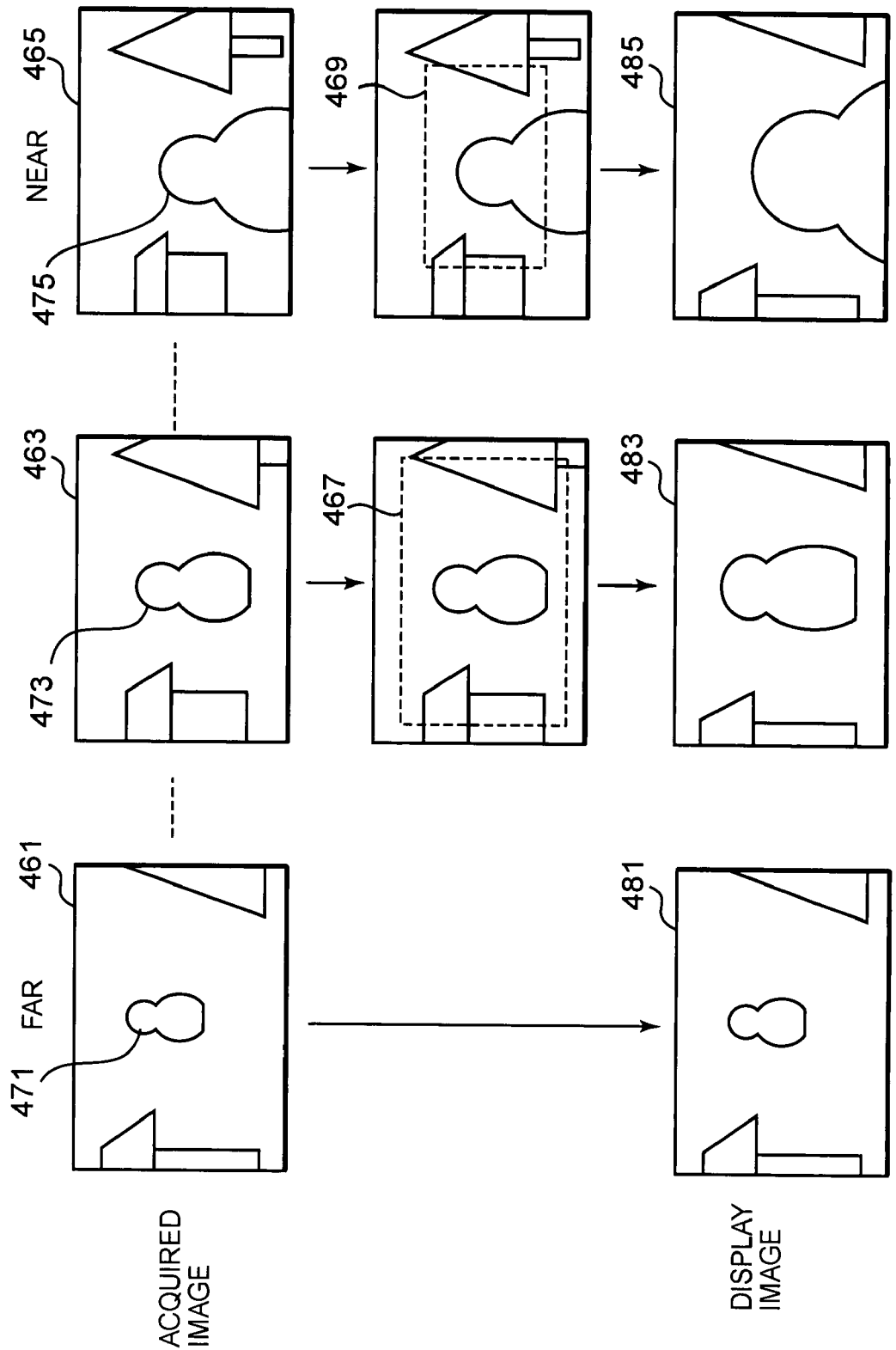
FIG. 8 is a view for explaining copping according to the preferred embodiment of the present invention.

Since the lenses have optical characteristics as shown in FIG. 7, if the in-focus position is changed even without operating a focal-length adjusting member of the lens barrel 10, acquired images change in angle of view as shown in the upper part of FIG. 8. In other words, the angle of view of an acquired far-distance image 461 acquired by focusing on a far subject 471 is narrower than that of an acquired middle-distance image 463 acquired by focusing on a middle-distance subject 473, and the angle of view of the acquired middle-distance image 463 of the middle-distance subject is narrower than that of an acquired near-distance image 465 acquired by focusing on a near subject 475.

Thus, the angle of view changes as the in-focus position changes despite that the focal-length adjusting member is not operated, and this causes a sense of discomfort. Therefore, in the embodiment, a crop area is defined to make the angle of view constant. In other words, a crop area 467 for the acquired middle-distance image 463 and a crop area 469 for the acquired near-distance image 465 are defined, and images in these crop areas 467, 369 are cropped. This makes it possible to obtain display images with a constant angle of view.

In the embodiment, an angle-of-view variation Δk corresponding to the set focal length and in-focus position is determined based on currently set focal length information and in-focus position information sent from the lens CPU 111, and the angle-of-view variations Δkt and Δkw stored in the lens data memory circuit 112. Then, based on the determined angle-of-view variation Δk, a crop area is defined and the image processing circuit 227 is instructed to crop image data corresponding to the crop area. Thus, in the embodiment, moving image display and moving image recording are performed with a constant angle of view regardless of the in-focus position. This cropping is performed on the basis of the narrowest angle of view within the range of angle-of-view variations.

The angle-of-view variation data stored in the lens data memory circuit 112 are Δkt and Δkw, and an angle-of-view variation for middle focal length is determined using an appropriate interpolation method. Further, since Δkt and Δkw are discrete values, they are also interpolated appropriately. Although the number of curves of angle-of-view variation data Δk is two in the embodiment, a number of curves other than two can be stored.

Next, the subroutine for moving image shooting operation in FIG. 5 will be described. First, the image processing circuit 227, the compression/decompression circuit 231, and the like are instructed that the current shooting mode is the moving image mode (S131) to cause the image processing circuit 227 to perform image processing appropriate for moving images and the compression/decompression circuit 231 to perform compression appropriate for moving images. Then, phase-difference AF 1 is performed in the same manner as in step S95 to perform focusing with a high degree of precision (S133). After completion of distance measurement and focus driving, the angle-of-view variation Δk is determined in the manner mentioned above, and cropping information based on this angle-of-view variation Δk is read (S135) to instruct the image processing circuit 227 of the cropping instruction (S137).

After completion of the crop instruction, it is determined whether the release button is fully pressed, i.e., whether 2R is on or not, like in step S99 (S139). As a result of determination, if it is off, the procedure goes to step S141 to determine whether 1R is on or not. If the release button remains pressed halfway after jumping to this subroutine for moving image shooting operation at the half-press of the release button, i.e., if 1R is on, the procedure enters a waiting loop consisting of steps S133 to S141 to perform repeated determinations. During this waiting state, phase-difference AF 1, reading of cropping information, and cropping instruction are performed.

Since the phase-difference AF 1 is repeatedly performed, the focusing operation can be automatically performed even if the framing is changed or the subject has moved. Further, even if the in-focus position changes, since the reading of cropping information and the output of cropping instruction are repeated, a constant angle of view can be maintained. When the camera user has removed his or her finger from the release button to turn 1R off, the procedure returns from step S141 to step S9 in the power-on reset routine.

As a result of determination in step S137, if 2R switch is on, i.e., when the release button is fully pressed, the procedure shifts to the imaging operation for acquiring a moving image, i.e., it goes to step S145 in which the image processing circuit 227 and the compression/decompression circuit 231 are instructed of the image size and compression ratio like in step S93. During live view display, image processing is performed to display a moving image in a predetermined image size regardless of the image size, while during moving image shooting, image processing is performed to record the moving image with the image size and compression ratio instructed in this step.

After completion of instruction in step S145, the procedure goes to step S147 to instruct the start of moving image recording. When the moving image recording is started, the CCD 221 performs imaging at the set electronic shutter speed TV, the image processing circuit 227 processes the subject image signal output from the CCD 221, and the compression/decompression circuit 231 compresses the image data in JPEG format on a frame-by-frame basis. The processed image data are stored in the SDRAM 238. Although the mirror member 201 is retracted from the shooting optical path during still image shooting, it is not retracted during moving image shooting. This is to have the mirror member 201 guide the subject light beam to the distance measurement/light metering sensor 217 in order to actuate the automatic focusing operation during moving image shooting. Therefore, even if the subject distance changes during moving image shooting, shooting can be performed in an always in-focus state.

Then, the procedure goes to step S149 to determine the memory capacity of the SDRAM 238 used as the buffer memory is full or not. As a result of determination, if it is not full, the procedure goes to step S171 to determine whether 2R switch is on or not, i.e., whether the camera user has fully pressed the release button and the moving image shooting is continued. As a result of determination, if 2R switch is on, the procedure goes to step S173 to set moving image conditions. Although in step S21 the electronic shutter speed TV and the ISO sensitivity SV are adjusted to enable an image display with a target brightness, since the subject brightness can change due to a framing change and the like during moving image shooting, this step is not only to provide a display with a target brightness during moving image shooting, but also to record image data with a constant brightness.

Note that, unlike still image shooting, the aperture 103 is not narrowed during moving image shooting. This is because phase-difference AF 2 is performed to be described later during moving image shooting and the aperture value needs to be set to the maximum aperture in order to secure the accuracy of distance measurement. Therefore, the amount of exposure during moving image shooting is determined by the electronic shutter speed TV, and if the amount of exposure is not sufficient, it is compensated by changing the ISO sensitivity SV. Note that the aperture 103 can be narrowed if the accuracy of distance measurement is secured.

After completion of setting the moving image conditions, the procedure goes to step S175 to perform phase-difference AF 2. This phase-difference AF 2 is lower in focusing accuracy than the phase-difference AF 1 in step S133. This is because if the focusing accuracy is set high, the camera can track changes in subject image upon shooting a moving object to cause the photographing lens to be driven fractionally, resulting in poor usability. The details of this phase-difference AF 2 will be described later with reference to FIG. 6.

After completion of phase-difference AF 2, cropping information is read (S177) like in step S135, and the cropping is instructed (S179) like in step S137. Thus, cropping is performed based on the angle-of-view variation Δk during moving image recording unless zooming is performed, so that the angle of view can be maintained constant even if the in-focus position of the subject changes. After cropping is instructed, the procedure returns to step S149 to repeat the above-mentioned steps.

When it is determined in step S149 that the memory capacity of the SDRAM 238 recording image data is full, or when it is determined in S171 that 2R is off, i.e., that the camera user has removed his or her finger from the release button to stop shooting, the procedure goes to step S151 to instruct stop of recording. Then, a moving image file is generated in MJPEG (Motion JPEG) format for moving images based on the JPEG image data generated on a frame-by-frame basis and stored in the SDRAM 238 (S153). The generated moving image file is recorded on the recording medium 245 through the recording medium control circuit 243 (S155). After completion of recording of the moving image file, the procedure returns to step S9 in the power-on reset routine to repeat the above-mentioned steps.

In the subroutine for moving image shooting operation of the embodiment, since the mirror member 201 remains in the shooting optical path, the subject light beam reflected from this mirror member 201 is used to perform distance measurement and focus driving by the phase-difference AF so that an in-focus moving image can be obtained. Especially note that TTL phase-difference AF has the advantage of excellent tracking ability even if the subject distance changes greatly.

Figure 6:
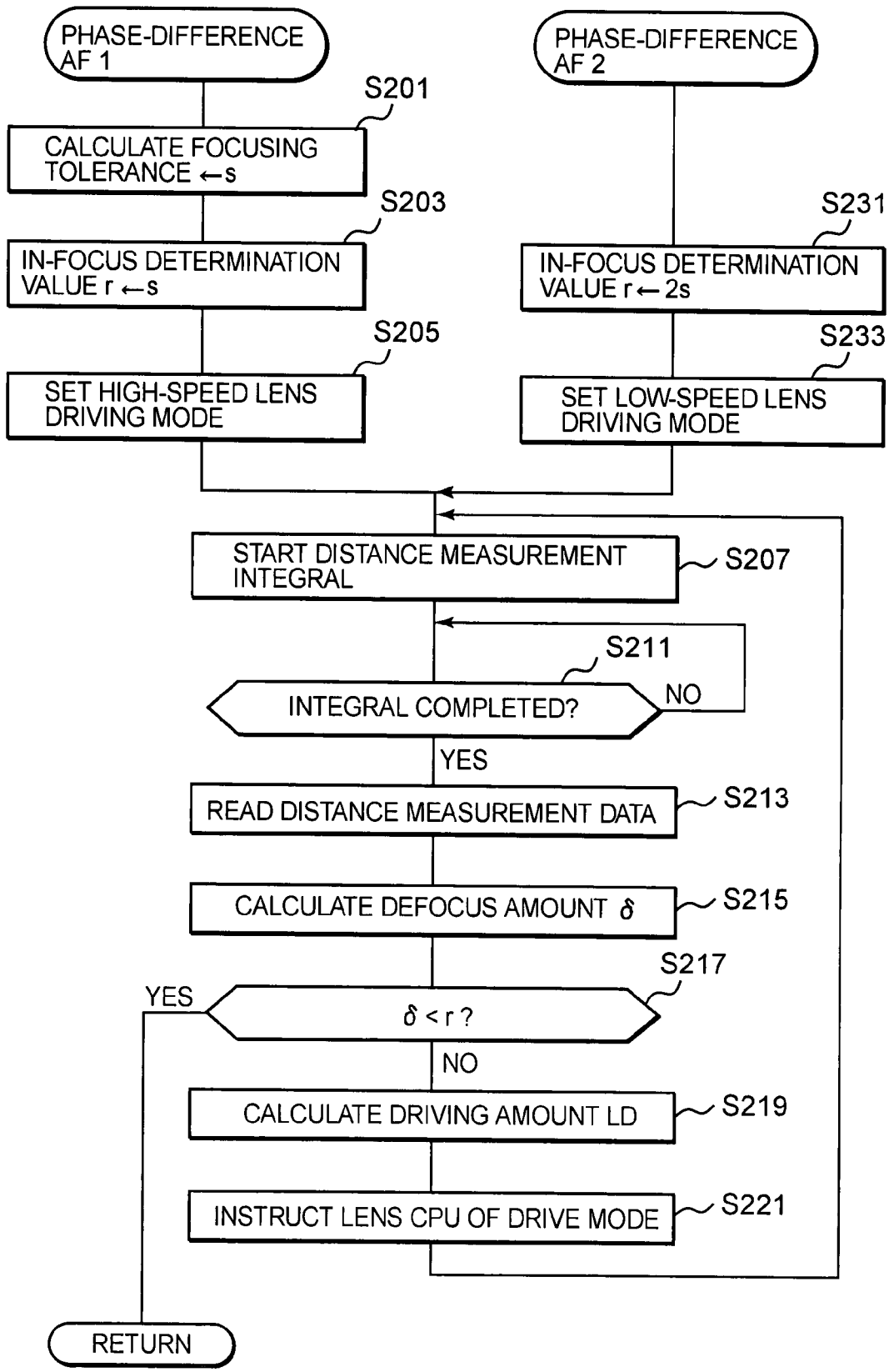
FIG. 6 is a flowchart of phase-difference AF 1 and phase-difference AF 2 according to the preferred embodiment of the present invention.

Referring next to FIG. 6, the phase-difference AF 1 subroutine in steps S95 and S133, and the phase-difference AF 2 subroutine in step S175 will be described. These subroutines are to change in-focus determination values according to the shooting conditions such as those for still image shooting or moving image shooting, and to change the lens driving speed for focus adjustment.

When the digital camera enters the phase-difference AF 1 subroutine, focusing tolerance s is first calculated (S201). This focusing tolerance s is determined by the multiplication of maximum aperture value F and acceptable circle of confusion ε as follows:

$$s = \epsilon \times F$$

In the embodiment, the acceptable circle of confusion is set to 30 μm, but it can be set to any other acceptable value depending on the design concept. The focusing tolerance s determined in this step is set as an in-focus determination value r (S203). The in-focus determination value r is a value used in determining, in a manner to be described later, whether the defocus amount δ obtained by the phase-difference AF falls within an in-focus range or not. Then, a high-speed lens driving mode is set as the lens drive mode (S205). The high-speed lens driving mode is a mode for determining the lens driving speed for focus adjustment. In the embodiment, the high-speed lens driving mode and a low-speed lens driving mode are provided.

After completion of setting of the high-speed lens driving mode, an integral of distance measurement is started (S207). Since the subject light beam passing through the periphery of the photographing lens is incident on the distance measurement sensor in the measurement/light metering sensor 217 through the mirror member 201, a distance measurement integral operation of this distance measurement sensor is started. The level of this distance measurement integral is detected (S211), and once it reaches a predetermined level, the integral operation is completed. Then, the distance measurement data is read from the distance measurement sensor (S213), and the defocus amount δ is calculated according to a known phase-difference distance measurement operation (S215).

Next, the calculated defocus amount δ is compared with the in-focus determination value r set in step S231 to be described later (S217). As a result of comparison, if the defocus amount δ is smaller than the in-focus determination value r, i.e., if the defocus amount of the photographing lens is smaller than the in-focus determination value and hence the photographing lens can be considered to be in focus, the automatic focusing by the phase-difference AF 1 is terminated and the procedure returns to the original routine.

In step S217, if the defocus amount δ is larger than the in-focus determination value r, since the defocus amount of the photographing lens is too large to consider that the photographing lens is in focus, the procedure goes to step S219 to calculate a driving amount LD for driving the photographing lens to the in-focus position. Then, driving instructions such as the drive mode of the photographing lens are output to the lens CPU 111 (S221). Here, the high-speed lens driving mode set in step S205 (or the low-speed lens driving mode set in step S233 to be described later), the defocus direction (driving direction) determined from the defocus amount δ calculation, and the driving amount LD calculated in step S219 are transmitted to the lens CPU 111.

Figure 10:
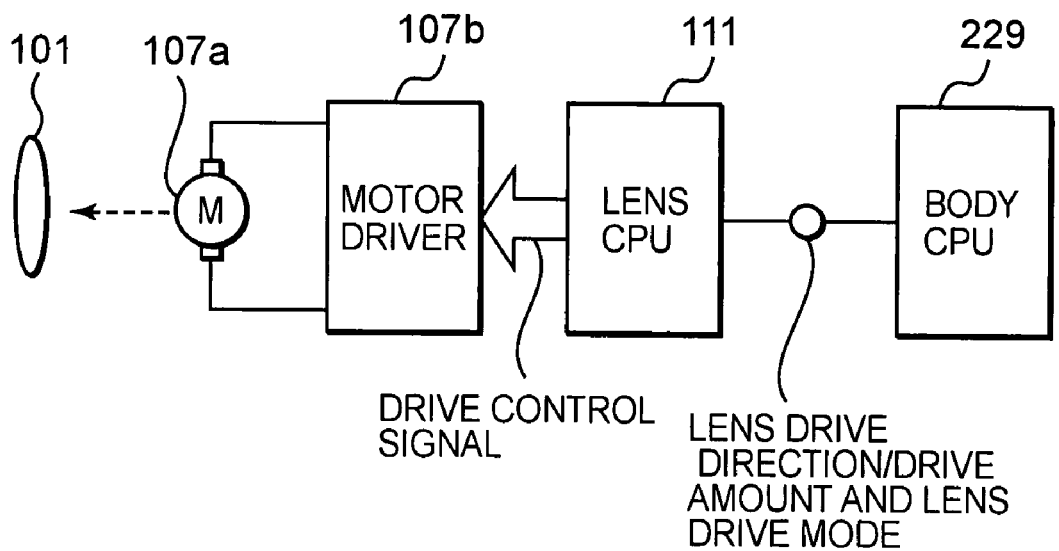
FIG. 10 is a block diagram showing a signal flow for driving the photographing lens according to the preferred embodiment of the present invention.

The flow of a signal for driving the photographing lens will be described here with respect to FIG. 10. In step 221, the body CPU (first CPU) 229 sends the lens driving direction, the driving amount LD, and the lens drive mode to the lens CPU 111 (second CPU) functioning as a focusing part. Based on the transmitted information, the lens CPU 111 converts the signal to a drive control signal for a motor driver 107b driving a motor 107a in the optical system driving mechanism 107. Then, based on this converted drive control signal, the motor 107a controls the driving of the lens 101 toward an in-focus point.

Figure 9:
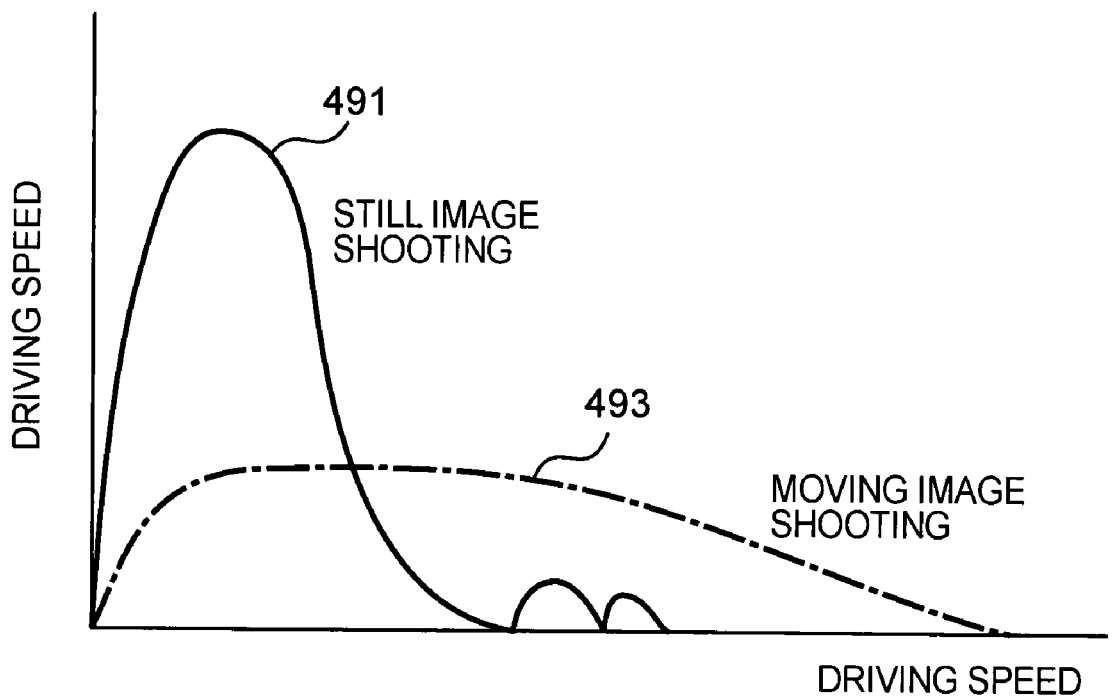
FIG. 9 is a graph showing driving states of a photographing lens according to the preferred embodiment of the present invention.

Upon this drive control, if the high-speed lens driving mode is sent, the lens CPU 111 controls driving at a driving speed according to a drive curve 491 shown in FIG. 9. In other words, the lens is first driven at a high speed. Then, after being stopped once, the distance measurement is made again, and fine driving is performed based on the distance measurement result. This focusing mode is suitable for still images and called a first focusing operation below. On the other hand, if the low-speed lens driving mode is sent, the lens CPU 111 controls driving at a driving speed according to a drive curve 493. In other words, the lens is driven toward the in-focus position slowly at a low speed without being driven at a high speed at all. In this case, it takes more time to reach the in-focus state than the high-speed lens driving, but the lens can be driven toward the in-focus point smoothly without a hitch. This focusing mode is suitable for moving objects and called a second focusing operation below. Note that, although the high-speed drive mode of the drive curve 491 is a drive control mode suitable for still image shooting, it is also employed for focusing in step S133 before the start of shooting a moving object in the subroutine for moving image shooting operation of FIG. 5. Here, the ratio of the low-speed lens driving to the high-speed lens driving can be set to such a value as not to cause a sense of discomfort for moving image shooting but not to be too slow.

Returning to step S221, after completion of instructing the lens CPU 111 of the drive mode, the procedure returns to step S207 again to repeat the above-mentioned steps. Thus, the distance measurement and photographing lens driving by the phase-difference AF is repeated through steps S207 to step S221 until the photographing lens falls within the in-focus range.

Next, the digital camera enters the phase-difference AF 2 subroutine. First, a value 2s double the focusing tolerance s is set as the in-focus determination value r (S231). In this phase-difference AF 2, the focusing tolerance for determining focusing accuracy is set to a value about double the tolerance in the phase-difference AF 1 to lower the accuracy. This is because if the focusing accuracy is set high, the photographing lens is driven fractionally as mentioned above to cause a hunting phenomenon or the like, resulting in poor usability. In the embodiment, the in-focus determination value is set to that is double the focusing tolerance s, but the present invention is not limited to this value and any other value can be employed as long as the accuracy is lower than that of the phase-difference AF 1.

After completion of setting the in-focus determination value, the low-speed lens driving mode is set as the lens drive mode (S233). As mentioned above, if the lens is driven in the high-speed lens driving mode during moving image shooting, driving and stopping are repeated fractionally to increase the possibility of causing hunting. Therefore, in the embodiment, the low-speed driving with less acceleration and deceleration cycles is performed during moving image shooting as indicated by the drive curve 493 in FIG. 9. Since the lens is driven toward the in-focus point smoothly without a hitch, a reasonable picture without a sense of discomfort can be obtained during moving image playback.

After completion of setting the low-speed lens driving mode, the above-mentioned steps S207 to S221 are repeated so that the lens CPU 111 performs low-speed driving of the lens to perform focusing on the subject based on the defocus direction and the defocus amount δ obtained by the phase-difference AF. Further, even if the subject is moving, the lens CPU 111 can perform focusing by tracking the moving subject. In step S217, if the lens falls within the in-focus range, the procedure returns to the subroutine for moving object shooting operation.

Figure 11:
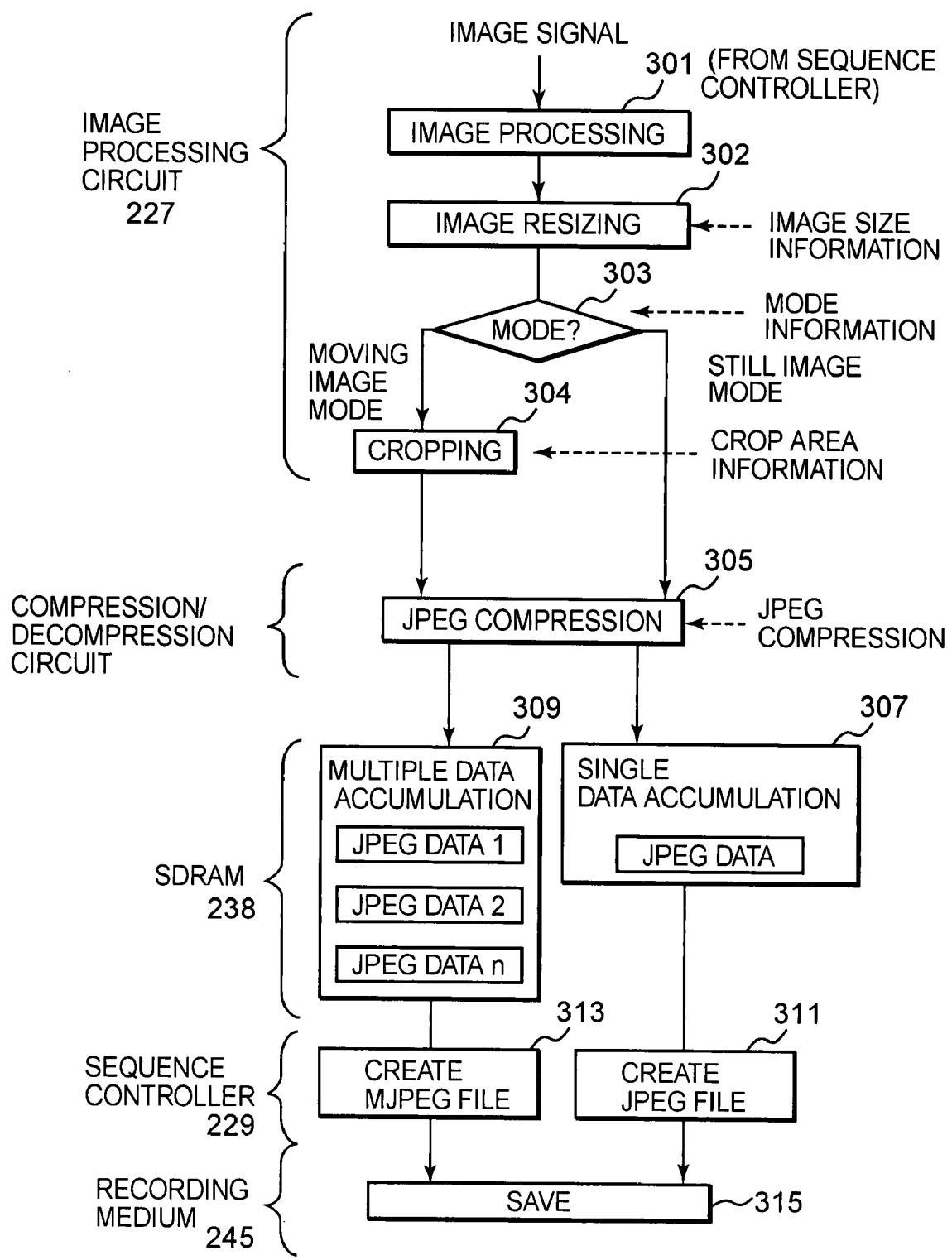
FIG. 11 is a flowchart showing data processing according to the preferred embodiment of the present invention.

Referring next to FIG. 11, a flow of data processing related to images in the embodiment will be described. The image processing circuit 227 performs various image processing (301) on the image signal output from the CCD 221. Further, the image processing circuit 227 performs image resizing (302) using the processed image signal. This resizing is done according to the image size instructed in step S93 or step S145.

Next, according to the shooting mode, resized image data are sorted (303). This sorting corresponds to processing in step S53, but even in the moving image mode, the phase-difference AF 1 is performed in step S133 before the start of shooting a moving object. In case of the moving image mode, cropping (304) is done based on the crop area information. As mentioned above, images are cropped to make the angle of view constant even if the focusing position (in-focus position) changes without changing the focal length.

The image data of a moving image after subjected to cropping or the image data of a still image after subjected to resizing is next sent to the compression/decompression circuit 231 and subjected to JPEG compression (305). Here, the compression is performed at the compression ratio instructed in step S93 or step S145. When the still image shooting is selected, the image data after subjected to JPEG compression is stored in the SDRAM 238 in the form of single data accumulation (307). Then, the sequence controller creates a JPEG file (311) based on the JPEG data stored in the SDRAM 238.

On the other hand, when the moving image shooting is selected, image data after subjected to JPEG compression (305) are sequentially stored in the SDRAM 238 in response to the start of moving image recording in step S147. Then, storing of JPEG image data is stopped in response to stop of moving image recording in step S151, and the sequence controller performs moving image compression according to MJPEG (Motion JPEG) as a moving image compression format to create an MJPEG file (313). Next, the MJPEG file or the JPEG file is recorded on the recording medium 245 (315) in response to file recording in step S121 or step S155.

Thus, in the embodiment, the in-focus determination value r varies between still image shooting and moving image shooting (see steps S203, S231, and S217 in FIG. 6). Therefore, high-precision focusing on the subject can be achieved during still image shooting, while focusing without a sense of discomfort can be performed during moving object shooting because the photographing lens is driven smoothly without a hitch. In the embodiment, distance measurement is performed by the phase-difference AF, but the present invention is not limited to phase-difference AF. The present invention is applicable to contrast AF for performing AF by extracting high frequency components from the subject image signal output from the image pickup device. In this case, a threshold value considered to be in focus in the contrast AF system can vary between still image shooting and moving object shooting, i.e., the threshold value range for moving object shooting can be set wider than that for still image shooting.

Further, in the embodiment, the driving speed of the photographing lens varies between still image shooting and moving image shooting (see S205, S233, and S221 in FIG. 6). Therefore, the photographing lens can be driven quickly to the in-focus point during still image shooting, while focusing without a sense of discomfort can be performed during moving object shooting because the photographing lens is driven smoothly without a hitch. In the embodiment, since distance measurement is performed by the phase-difference AF, the defocus amount δ is calculated. However, even in a system like contrast AF in which no defocus amount δ is calculated, if the driving speed of the photographing lens varies between still image shooting and moving object shooting, the same effects as that of the embodiment can be obtained.

Further, in the embodiment, image cropping is performed according to the angle-of-view variation of the photographing lens (see S135, S137, S177, and S179 in FIG. 5). Therefore, even if the in-focus position of the subject changes during moving image shooting, a constant angle of view can be maintained and hence an image without a sense of discomfort can be obtained. In the embodiment, this cropping is performed only in the moving image shooting operation, but cropping can also be performed during live view display in the still image shooting mode.

Further, in the embodiment, since the target image quality is different between still image shooting and moving image shooting, the position of the mirror member 201 is changed. In other words, since still image shooting typically requires a high image quality, the mirror member 201 is retracted from the shooting optical path to prevent degradation of image quality caused by the mirror member 201. On the other hand, since moving image shooting does not require the high quality for still image shooting, the mirror member 201 remains in the shooting optical path to eliminate the time required for inserting and retracting the mirror in order to reduce the time lag to the start of shooting.

Further, in the embodiment, the mirror member 201 is inserted into the shooting optical path upon activation of the camera to reflect part of the subject light beam into the distance measurement/light metering sensor 217. Therefore, when the release button 21 is pressed halfway to turn 1R on during live view display, light metering and distance measurement can be performed immediately and conveniently in parallel with the live view display.

In the embodiment, the CCD 221 as the image pickup device receives light transmitted through the mirror member 201, while the distance measurement/light metering sensor 217 receives light reflected by mirror member 201. However, on the contrary, the digital camera can be configured such that the CCD 221 receives reflected light and the distance measurement/light metering sensor 217 receives transmitted light.

Further, in the embodiment, the present invention is applied to a normal digital camera, but the present invention is not limited thereto, and it can also be applied to a digital camera incorporated in any of various apparatuses such as a cellular phone. Further, it can, of course, be applied to a special digital camera attached to any of various apparatuses such as a microscope or binoculars. The present invention can be applied to any kind of digital camera as long as it can record a shooting target as both a still image and a moving image.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A digital camera having a still image shooting mode and a moving image shooting mode, the digital camera comprising:
   a mirror member arranged in an optical path of a photographing lens to reflect part of a subject light beam passing through the photographing lens and transmit the remaining part of the subject light beam;
   an imaging part for receiving the subject light beam transmitted through the mirror member to output a subject image signal;
   a distance measurement part for receiving the subject light beam reflected by the mirror member to detect a defocus amount of the photographing lens; and
   a focusing part for performing a focusing operation to drive a focusing optical system in the photographing lens to an in-focus position based on the defocus amount detected by the distance measurement part,
   wherein in the still image shooting mode, the focusing part performs a first focusing operation prior to still image shooting, and in the moving image shooting mode, the focusing part performs a second focusing operation different in mode from the first focusing operation during moving image recording.

2. The digital camera according to claim 1, wherein the focusing part varies a range of focusing tolerance between the first focusing operation and the second focusing operation in such a manner to set the range of focusing tolerance in the second focusing operation wider than that in the first focusing operation.

3. The digital camera according to claim 1, wherein the focusing part varies a driving speed of the focusing optical system between the first focusing operation and the second focusing operation in such a manner that a focusing time in the second focusing operation gets longer than that in the first focusing operation.

4. The digital camera according to claim 1, wherein the distance measurement part detects the defocus amount and a defocus direction by a phase difference method using the subject light beam passing through the photographing lens.

5. The digital camera according to claim 1, wherein the first focusing operation is performed in the moving image shooting mode prior to start of moving image recording.

6. The digital camera according to claim 1, wherein the photographing lens incorporates an aperture mechanism therein, the aperture mechanism maintains a maximum open state of the aperture mechanism in the moving image shooting mode.

7. A digital camera having a still image shooting mode and a moving image shooting mode, the digital camera comprising:
   an optical member arranged in an optical path of a photographing lens to split part of a subject light beam passing through the photographing lens into a light beam in a first direction and a light beam in a second direction;
   an imaging part for receiving the light beam split in the first direction to output a subject image signal;
   a distance measurement part for receiving the light beam split in the second direction to detect a defocus amount of the photographing lens; and
   a focusing part for performing a focusing operation to drive a focusing optical system in the photographing lens to an in-focus position based on the defocus amount detected by the distance measurement part, wherein the focusing part varies a mode of the focusing operation between the still image shooting mode and the moving image shooting mode.

8. The digital camera according to claim 7, wherein the focusing part varies a range of focusing tolerance between the still image shooting mode and the moving image shooting mode.

9. The digital camera according to 8, wherein the focusing part sets the focusing tolerance in the moving image shooting mode wider than that in the still image shooting mode.

10. The digital camera according to claim 7, wherein the focusing part varies a driving speed of the focusing optical system between the still image shooting mode and the moving image shooting mode.

11. The digital camera according to claim 10, wherein the focusing part sets the driving speed of the focusing optical system in such a manner that a focusing time of the focusing optical system in the moving image shooting mode gets longer than that in the still image shooting mode.

12. The digital camera according to claim 7, wherein the distance measurement part detects the defocus amount and a defocus direction by a phase difference method using the subject light beam passing through photographing lens.

13. An imaging method for a digital camera having a still image shooting mode and a moving image shooting mode, the imaging method comprising:

detecting that imaging is instructed;

detecting whether a selected shooting mode is the still image shooting mode or the moving image shooting mode;

focusing a photographing lens by performing a first focusing operation when the selected shooting mode is the still image shooting mode or a second focusing operation when the selected shooting mode is the moving image shooting mode; and performing imaging to acquire a still image or moving image depending on the selected shooting mode, wherein the second focusing operation is such that at least either (1) a focusing tolerance is wider or (2) a focusing speed is slower, than the first focusing operation.

* * * * *